May 8, 1928.
E. F. GINGRAS
SANITARY COVER FOR ICE CREAM CONES
Filed Aug. 7, 1924
1,669,237
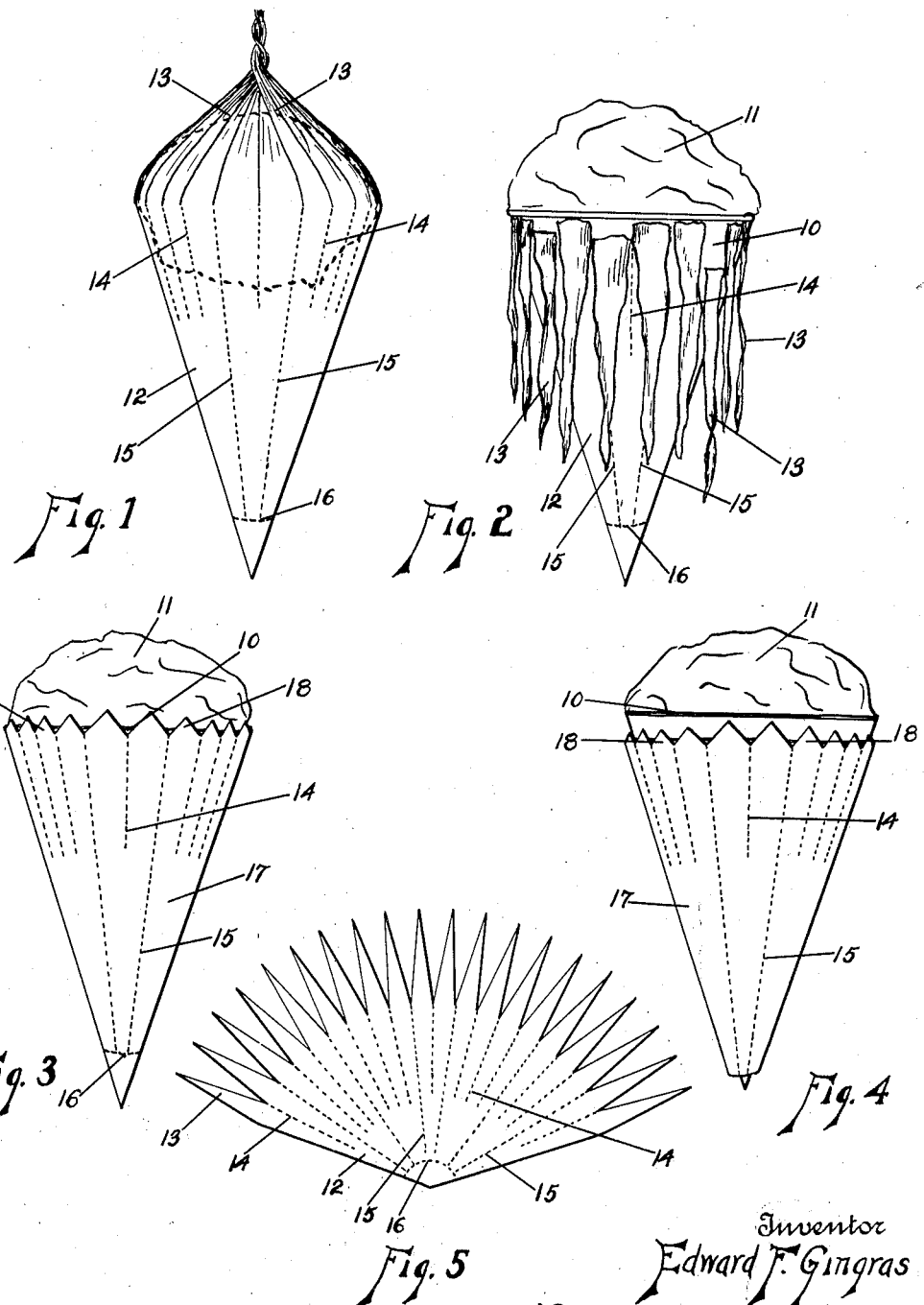
Inventor
Edward F. Gingras
By Clarence S. Walker
His Attorney Patented May 8, 1928.

1,669,237

UNITED STATES PATENT OFFICE.

EDWARD F. GINGRAS, OF BUFFALO, NEW YORK.

SANITARY COVER FOR ICE-CREAM CONES.

Application filed August 7, 1924. Serial No. 730,730.

This invention relates to sanitary covers for ice cream cones, and more particularly to those made of thin paper and easily removable in segments.

One object of this invention is to provide a protecting cover for confections such as ice cream cones, having the cover of such construction of thin paper with scored or weakened lines, such that the same may easily be removed as the cone is eaten.

Another object is to provide such a cover with loose tabs which shall serve the double purpose of protecting the ice cream in the cone, and of forming individual tongues to facilitate removal of the cover in sections from the cone so as to expose the upper part of the cone and the ice cream, when about to be eaten, leaving the lower part of the cone still protected by the wrapper.

A further object is to provide such a cover with a weakened or scored ring adjacent the tip of the cone whereby the lower end of the covering can easily be removed and the tip of the cone exposed, so that while the cover is held in the hand, the cone can be pushed up until the upper edge of the cone projects above the cover, when it can be grasped and lifted out of the cover.

Other objects, residing in certain details of construction of the cover, will appear from a consideration of the following description, taken in connection with the accompanying drawing which forms a part thereof, and in which:

Figure 1 is an elevation of a cone filled with ice cream and completely protected by a cover embodying one form of my invention.

Figure 2 is an elevation of the cone and ice cream shown in Fig. 1, with the tabs of the cover which collectively cover the ice cream turned down so that the cream can be eaten.

Fig. 3 is an elevation of a cone filled with ice cream provided with a cover embodying another form of my invention which protects the cone only.

Fig. 4 shows the embodiment of Fig. 3 with the bottom of the cover removed and the cone raised for removal from the cover.

Fig. 5 is a view of the cover of the first form before it is applied to the cone.

In the drawings, the edible cone 10 is shown containing a ball of ice cream 11 and protected by a cover 12 having tabs 13, which are long enough to be twisted together at the top to completely enclose the ice cream 11.

Downwardly converging from the tabs 13 are weakened or scored lines 14 15 which, as shown in Fig. 2, permit removal of part of the covering so that the cone as well as the ice cream can be eaten. As the cone is consumed, the tabs 13 are pulled down, the cover tearing along the lines 14 15. It will be noted that the lines 15 terminate in a weakened or scored annular line or ring 16 near the bottom of the cover. The provision of these lines permits uncovering the cone as it is eaten until the tip is reached, and also in case it is desired to remove the cover entirely, this can be done by tearing the cover along the lines 15, the exposed upper end of the cone being held between the fingers.

The embodiment disclosed in Figs. 3 and 4 differs from that disclosed in Figs. 1 and 2 by the omission of the long tabs by which the contents of the cone are protected, and is followed usually where the cover is made of a heavier material and where there is no need to protect the ice cream as well as the cone. Such a condition arises at a soda fountain, for instance, where the cone is eaten as soon as filled. There the cones are placed in the covers 17 so as to protect them against their being soiled by the hands of the server or purchaser.

In place of the long tabs 13, short tabs 18 are provided which can easily be grasped to tear down the cover along the weakened lines 14 15 as described above. Should it be desired to remove the cone without tearing down the cover, the bottom of the cover as defined by the ring 16 is torn off and the cone is raised from the cover so that the upper edge can be grasped and the cone lifted out of the cover.

While several embodiments have been shown and described, applicant is not to be limited thereby, since it is obvious that other embodiments can be made without departing from the spirit and scope of the invention as set forth in the following claim.

Having thus set forth my invention, what I claim as new and for which I desire the protection of Letters Patent is:

A sanitary cover for edible ice cream cones comprising a conical receiver of sheet material divided into a plurality of tapering portions by means of scored lines which weaken the material, said portions converging toward the small end of said cone, tab extensions to said portions at the large end of said cone serving as loose ends to said portions whereby the same may be pulled upon to tear off said portions individually to expose part of the contents of said cover, the small end of said cover being defined by a weakened or scored ring so that it can be torn off to expose the contents.

In testimony whereof I have affixed my signature.

EDWARD F. GINGRAS.